United States Patent
Oguma et al.

(10) Patent No.: US 12,187,157 B2
(45) Date of Patent: Jan. 7, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hirokazu Oguma, Wako (JP); Yasuo Yamada, Wako (JP); Arata Ohishi, Wako (JP); Minoru Nagasawa, Wako (JP); Yoshihiro Kanamaru, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 17/672,766

(22) Filed: Feb. 16, 2022

(65) Prior Publication Data

US 2022/0297571 A1 Sep. 22, 2022

(30) Foreign Application Priority Data

Mar. 19, 2021 (JP) ................ 2021-045740

(51) Int. Cl.
*B60L 58/18* (2019.01)
*B60L 1/00* (2006.01)
(Continued)

(52) U.S. Cl.
CPC .............. *B60L 58/18* (2019.02); *B60L 58/12* (2019.02); *H02J 7/0013* (2013.01);
(Continued)

(58) Field of Classification Search
CPC .......................... B60L 2240/54; B60L 2260/42
See application file for complete search history.

(56) References Cited

U.S. PATENT DOCUMENTS

2011/0101915 A1 5/2011 Mitsutani
2014/0236409 A1 8/2014 Nasu et al.
(Continued)

FOREIGN PATENT DOCUMENTS

EP 3070809 9/2016
JP 2011-109816 6/2011
(Continued)

OTHER PUBLICATIONS

European Search Report for European Application No. 22156951.0 dated Aug. 18, 2022.
(Continued)

*Primary Examiner* — Jaime Figueroa
*Assistant Examiner* — Jerrod Irvin Davis
(74) *Attorney, Agent, or Firm* — Amin, Turocy & Watson, LLP (57) ABSTRACT

A vehicle control device includes processor configured to execute computer-readable instructions to perform. The processor is configured to acquiring a state of a first battery and a state of a second battery, acquiring at least first actual output power of the first battery, calculating a first upper power limit value based on the state of the first battery, calculating a second upper power limit value based on the state of the second battery, and controlling a power conversion process of a power convertor based on the calculated upper power limit values, requested power from a vehicle to be output to a motor, and the first actual output power. The controlling of the power conversion process includes, when output instruction content for iteratively issuing an instruction is determined, calculating the second requested power obtained by correcting currently requested power based on a difference between previously requested power and the first actual output power.

10 Claims, 4 Drawing Sheets

(51) Int. Cl.
*B60L 58/12* (2019.01)
*H02J 7/00* (2006.01)

(52) U.S. Cl.
CPC ........ *H02J 7/00306* (2020.01); *H02J 7/0048* (2020.01); *H02J 7/0063* (2013.01); *B60L 1/00* (2013.01); *B60L 2240/54* (2013.01); *B60L 2260/42* (2013.01)

(56) References Cited

U.S. PATENT DOCUMENTS

| | | | |
|---|---|---|---|
| 2014/0336861 A1 | 11/2014 | Huber et al. | |
| 2021/0094441 A1* | 4/2021 | Sampson | B60K 1/02 |
| 2023/0072786 A1* | 3/2023 | Morita | H02J 7/342 |

FOREIGN PATENT DOCUMENTS

| | | |
|---|---|---|
| JP | 2011-182542 | 9/2011 |
| JP | 2014-187756 | 10/2014 |
| JP | 2015-505778 | 2/2015 |
| JP | 2015-070726 | 4/2015 |
| JP | 2015-139328 | 7/2015 |
| JP | 2017-099244 | 6/2017 |

OTHER PUBLICATIONS

Japanese Office Action for Japanese Patent Application No. 2021-045740 mailed Oct. 15, 2024.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2021-045740, filed Mar. 19, 2021, the content of which is incorporated herein by reference.

BACKGROUND OF THE INVENTION

Field of the Invention

The present invention relates to a vehicle control device, a vehicle control method, and a storage medium.

Description of Related Art

In recent years, for example, development of electric vehicles such as hybrid electric vehicles (HEV) and plug-in hybrid electric vehicles (PHEV), each of which performs traveling using an electric motor driven with at least electric power supplied by a battery (a secondary battery), has progressed. In these electric vehicles, the driving of the electric motor is controlled on the basis of the amount of electric power stored in the battery. Further, in a recent electric vehicle system, for example, a combination of two different types of batteries such as a low-power and high-capacity battery (hereinafter referred to as a "high-capacity type battery") and a low-capacity and high-power battery (hereinafter referred to as a "high-power type battery") has also been put into practical use (for example, see Japanese Unexamined Patent Application, First Publication No. 2017-099244).

In a system of an electric vehicle in which two types of batteries are combined, electric power is supplied from the high-capacity type battery in normal traveling in which the driving force required for an electric motor is small, for example, when the electric vehicle travels on flat ground or climbs a gentle slope or the like, and electric power obtained by adding electric power from the high-power type battery to electric power from the high-capacity type battery is supplied in a case where the driving force required for the electric motor becomes large, for example, when the electric vehicle climbs a steep slope or accelerates. In the system of the electric vehicle, electric power is output to the electric motor according to a request of the electric vehicle in response to a driving operation by a user (a driver) of the electric vehicle. Here, when the electric power from the high-power type battery is added to the electric power from the high-capacity type battery in the system of the electric vehicle in which two types of batteries are combined, it is conceivable to output electric power from the high-power type battery at a timing when the electric power to be output to the electric motor in response to the request from the electric vehicle exceeds an upper power limit value of the electric power in the high-capacity type battery.

Incidentally, the demand for electric power from the electric vehicle depends on the driving operation by the driver. In the conventional system of the electric vehicle, an amount of electric power requested from the electric vehicle has been obtained in an estimation process. In this case, the amount of electric power requested from the electric vehicle changes according to the accuracy of estimation thereof. Thus, the timing at which the requested amount of electric power exceeds an upper power limit value of the electric power in the high-capacity type battery also changes according to the accuracy of estimation. That is, there may be an error between the timing when the requested amount of electric power actually exceeds the upper power limit value of the high-capacity type battery and the estimated timing.

When the amount of electric power requested from the electric vehicle is estimated to be large, an early timing as a timing when the high-capacity type battery exceeds the upper power limit value is estimated and the electric power is output from the high-power type battery before the electric power actually output by the high-capacity type battery exceeds the upper power limit value. In this case, the performance for outputting the electric power of the high-capacity type battery cannot be maximized and a total amount of electric power to be output to the electric motor in the electric vehicle is reduced. This can become a factor that reduces the performance of acceleration of the electric vehicle. In contrast, when the amount of electric power requested from the electric vehicle is estimated to be small, a late timing as the timing when the high-capacity type battery exceeds the upper power limit value is estimated and the electric power is output from the high-power type battery after the high-capacity type battery actually outputs electric power exceeding the upper power limit value. In this case, the high-capacity type battery becomes over-discharged, which may be a factor that accelerates the deterioration of the high-capacity type battery.

Furthermore, even if an instruction for adding electric power from the high-power type battery is issued, the electric power is not always immediately output from the high-power type battery and added to the electric power from the high-capacity type battery. That is, it must also be considered that a delay may occur before the electric power is actually output from the high-power type battery. In this case, it must also be considered that the high-capacity type battery becomes over-discharged while the output of the electric power from the high-power type battery is delayed and the deterioration of the high-capacity type battery is accelerated.

As described above, in the conventional technology, it may be difficult to obtain a suitable timing when electric power output from the other battery is added to electric power output from one battery in an electric vehicle in which two types of batteries are combined.

SUMMARY OF THE INVENTION

The present invention has been made on the basis of the recognition of the above-described problems and an objective of the present invention is to provide a vehicle control device, a vehicle control method, and a storage medium capable of obtaining a suitable timing when electric power output from one battery is added to electric power output from the other battery in an electric vehicle in which two types of batteries are combined.

A vehicle control device, a vehicle control method, and a storage medium according to the present invention adopt the following configurations.

(1): According to an aspect of the present invention, there is provided a vehicle control device including: a processor configured to execute computer-readable instructions to perform: acquiring a state of a first battery and a state of a second battery; acquiring at least first actual output power information indicating first actual output power that is actual output power actually output by the first battery; calculating a first upper power limit value that is an upper power limit value of the first battery based on the state of the first battery; calculating a second upper power limit value that is an upper power limit value of the second battery based on the state of the second battery; and controlling a power conversion process of a power convertor for converting electric power output by the first battery or electric power output by the first battery and the second battery into electric power to be output to a motor based on the calculated first upper power limit value, the calculated second upper power limit value, requested power to be output to the motor for outputting motive power for traveling requested from another control device of a vehicle, and the first actual output power indicated in the first actual output power information, wherein the controlling of the power conversion process includes, when output instruction content for iteratively issuing an instruction for the power conversion process in the power convertor is determined, calculating second requested power obtained by correcting currently requested power based on a difference between first requested power that is previously requested power and the first actual output power output in accordance with the first requested power and determining the output instruction content to cause the first battery to output the second requested power.

(2): In the above-described aspect (1), the processor is configured to execute the computer-readable instructions to perform: determining the output instruction content to further cause the second battery to output electric power at a timing when the second requested power reaches a first threshold value less than or equal to the first upper power limit value.

(3): In the above-described aspect (2), the first battery is a high-capacity and low-power battery, and the second battery is a battery having lower capacity and higher power than the first battery.

(4): In the above-described aspect (2) or (3), the processor is configured to execute the computer-readable instructions to perform: acquiring second actual output power information indicating second actual output power that is actual output power actually output by the second battery, when the second requested power has reached the first threshold value, determining the output instruction content to cause the second battery to output difference power between the second requested power and the first threshold value if the second requested power is less than the first upper power limit value, and determining the output instruction content to cause the second battery to output the difference power between the second requested power and the first upper power limit value after the difference power between the second requested power and the first threshold value is consistent with the second actual output power indicated in the second actual output power information.

(5): In any one of the above-described aspects (2) to (4), the processor is configured to execute the computer-readable instructions to perform: causing supply of electric power to equipment that consumes electric power outside of the motor to be stopped at a timing when the second requested power reaches a second threshold value less than a maximum power value obtained by combining the first upper power limit value and the second upper power limit value.

(6): In the above-described aspect (5), the processor is configured to execute the computer-readable instructions to perform: acquiring out-of-traveling consumption power that is electric power to be consumed outside of the motor, wherein the second threshold value is a value obtained by subtracting the out-of-traveling consumption power from the maximum power value.

(7): In the above-described aspect (6), the processor is configured to execute the computer-readable instructions to perform: controlling conversion of electric power output from the second battery in the power convertor to make the second requested power be at least the second threshold value and causing the supply of the electric power to the equipment to be restored at a timing when a prescribed time period has elapsed from the time when the supply of the electric power to the equipment was stopped.

(8): According to an aspect of the present invention, there is provided a vehicle control method including: acquiring, by a computer, a state of a first battery and a state of a second battery; acquiring, by the computer, at least first actual output power information indicating first actual output power that is actual output power actually output by the first battery; calculating, by the computer, a first upper power limit value that is an upper power limit value of the first battery based on the state of the first battery; calculating, by the computer, a second upper power limit value of the second battery that is an upper power limit value of the second battery based on the state of the second battery; and controlling, by the computer, a power conversion process of a power convertor for converting electric power output by the first battery or electric power output by the first battery and the second battery into electric power to be output to a motor based on the calculated first upper power limit value, the calculated second upper power limit value, requested power to be output to the motor for outputting motive power for traveling requested from another control device of a vehicle, and the first actual output power indicated in the first actual output power information; and when output instruction content for iteratively issuing an instruction for the power conversion process in the power convertor is determined, calculating, by the computer, second requested power obtained by correcting currently requested power based on a difference between first requested power that is previously requested power and the first actual output power output in accordance with the first requested power and determining the output instruction content to cause the first battery to output the second requested power.

(9): According to an aspect of the present invention, there is provided a non-transitory computer-readable storage medium storing a program for causing a computer to: acquire a state of a first battery and a state of a second battery; acquire at least first actual output power information indicating first actual output power that is actual output power actually output by the first battery; calculate a first upper power limit value that is an upper power limit value of the first battery based on the state of the first battery; calculate a second upper power limit value that is an upper power limit value of the second battery based on the state of the second battery; and control a power conversion process of a power convertor for converting electric power output by the first battery or electric power output by the first battery and the second battery into electric power to be output to a motor based on the calculated first upper power limit value, the calculated second upper power limit value, the requested power to be output to the motor for outputting motive power for traveling requested from another control device of a vehicle, and the first actual output power indicated in the first actual output power information; and when output instruction content for iteratively issuing an instruction for the power conversion process in the power convertor is determined, calculating second requested power obtained by correcting currently requested power based on a difference between first requested power that is previously requested power and the first actual output power output in accordance with the first requested power and determining the output instruction content to cause the first battery to output the second requested power.

According to the above-described aspects (1) to (9), it is possible to obtain a suitable timing when electric power output from one battery is added to electric power output from the other battery in an electric vehicle in which two types of batteries are combined.

DETAILED DESCRIPTION OF THE INVENTION

Hereinafter, embodiments of a vehicle control device, a vehicle control method, and a storage medium of the present invention will be described with reference to the drawings. As used throughout this disclosure, the singular forms "a," "an," and "the" include plural reference unless the context clearly dictates otherwise.
[Configuration of Vehicle]

Figure 1:
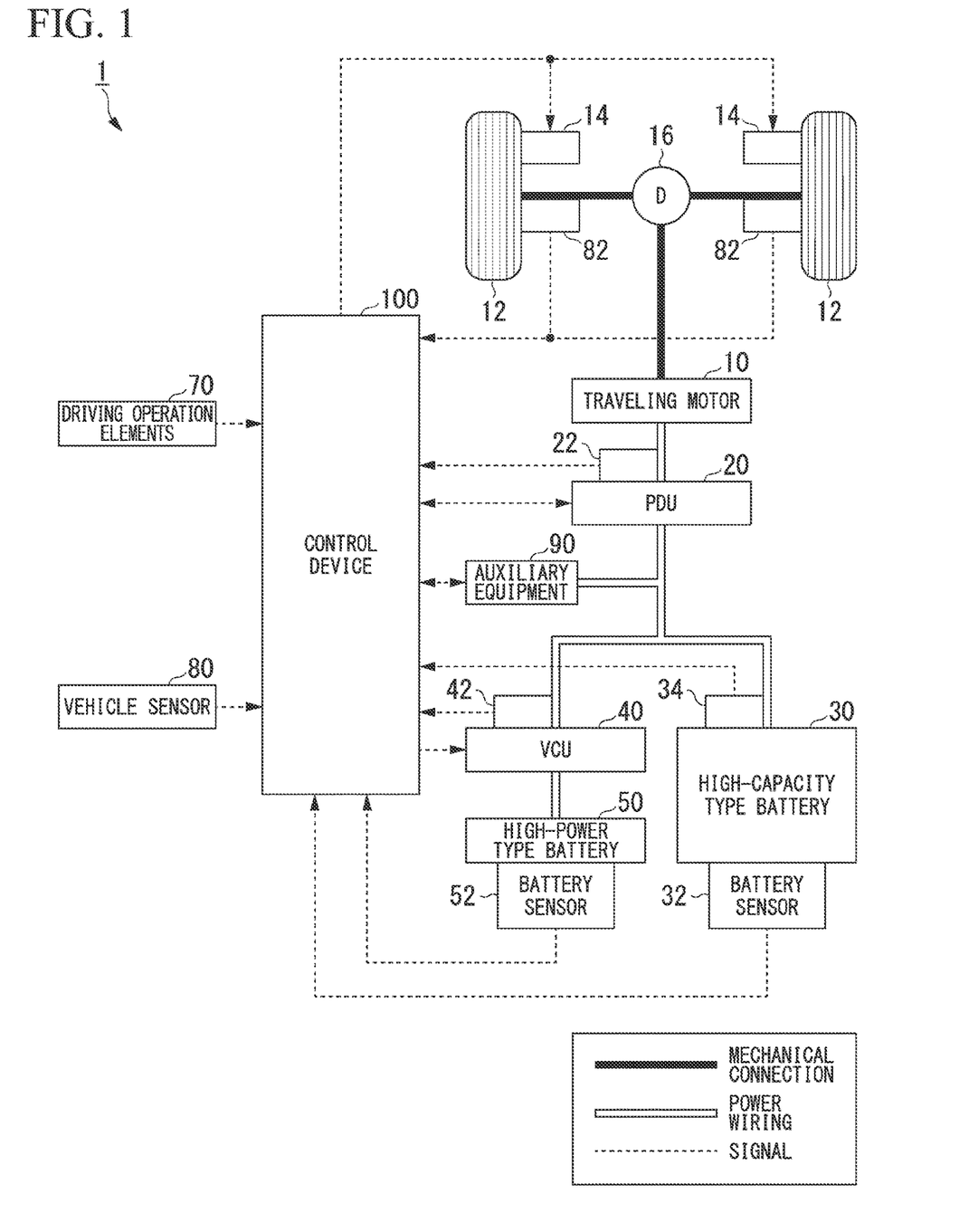
FIG. 1 is a diagram showing an example of a configuration of a vehicle according to an embodiment.

FIG. 1 is a diagram showing an example of a configuration of a vehicle according to an embodiment. A vehicle 1 is an electric vehicle (EV) (hereinafter simply referred to as a "vehicle") that travels using an electric motor driven by electric power supplied from a traveling battery (a secondary battery). The vehicle 1 is an electric vehicle of a multi-battery system equipped with two types of batteries including a high-capacity type battery having low power and high capacity and a high-power type battery having low capacity and high power. The vehicle 1 travels by driving the electric motor with the electric power supplied from one of the batteries or a combination of the electric power supplied from both batteries. Vehicles to which the present invention is applied include, for example, general four-wheeled vehicles, saddle-riding type two-wheeled vehicles, three-wheeled vehicles (including two front wheel and one rear wheel vehicles in addition to one front wheel and two rear wheel vehicles), and a vehicle that travels using an electric motor driven by electric power supplied from a traveling battery such as an assisted bicycle. The vehicle 1 may be, for example, a hybrid electric vehicle (HEV) that travels by further combining electric power supplied according to running of an internal combustion engine that uses fuel as an energy source, such as a diesel engine or a gasoline engine.

The vehicle 1 includes, for example, a traveling motor 10, a drive wheel 12, a brake device 14, a speed reducer 16, a power drive unit (PDU) 20, a power sensor 22, a high-capacity type battery 30, a battery sensor 32, a power sensor 34, a voltage control unit (VCU) 40, a power sensor 42, a high-power type battery 50, a battery sensor 52, a driving operation elements 70, a vehicle sensor 80, a wheel speed sensor 82, an auxiliary equipment 90, and a control device 100.

The traveling motor 10 is a rotating electric device for traveling of the vehicle 1. The traveling motor 10 is, for example, a three-phase alternating current (AC) electric motor. A rotor of the traveling motor 10 is connected to the speed reducer 16. The traveling motor 10 is driven (rotated) with electric power supplied from the high-capacity type battery 30 or electric power obtained by adding electric power supplied from the high-power type battery 50 via the VCU 40 to electric power supplied from the high-capacity type battery 30. The traveling motor 10 transfers its own rotational power to the speed reducer 16. The traveling motor 10 may operate as a regenerative brake using the kinetic energy of the vehicle 1 during deceleration to generate electricity. The traveling motor 10 is an example of a "motor" in the claims.

The brake device 14 arranged on the drive wheel 12 includes, for example, a brake caliper, a cylinder that transfers hydraulic pressure to the brake caliper, and an electric motor that causes a cylinder to generate the hydraulic pressure. The brake device 14 may include a mechanism for transferring the hydraulic pressure generated by an operation of a user (a driver) of the vehicle 1 on a brake pedal (not shown) to the cylinder via a master cylinder as a backup. The brake device 14 is not limited to the above-described configuration and may be an electronically controlled hydraulic brake device that transfers the hydraulic pressure of the master cylinder to the cylinder.

The speed reducer 16 is, for example, a differential gear. The speed reducer 16 causes a driving force of a shaft to which the traveling motor 10 is connected, i.e., rotational power of the traveling motor 10, to be transferred to an axle to which the drive wheel 12 is connected. The speed reducer 16 may include, for example, a so-called transmission mechanism in which a plurality of gears or shafts are combined to change the rotational speed of the traveling motor 10 in accordance with a gear ratio and cause the rotational speed to be transferred to the axle. The speed reducer 16 may also include, for example, a clutch mechanism that directly connects or separates the rotational power of the traveling motor 10 to or from the axle.

The PDU 20 is, for example, an AC-direct current (DC) converter. The PDU 20 converts DC power supplied from the high-capacity type battery 30 or supplied from the high-power type battery 50 via the VCU 40 in addition to the supply from the high-capacity type battery 30 into AC power for driving the traveling motor 10 and outputs the AC power to the traveling motor 10. The PDU 20 converts the AC power generated by the traveling motor 10 operating as a regenerative brake into DC power and outputs the DC power to the high-capacity type battery 30 or the VCU 40 (i.e., the high-power type battery 50). The PDU 20 may perform an output operation after a step-up or -down operation according to a power output destination. The PDU 20 is an example of a "power convertor" in the claims.

The power sensor 22 is attached to power wiring of the traveling motor 10 side in the PDU 20. The power sensor 22 includes, for example, measurement instruments such as a wattmeter, a voltmeter, and an ammeter, and measures electric power actually output to the traveling motor 10 by the PDU 20 (hereinafter referred to as "PDU-related actual output power") on the basis of measured values of these measurement instruments. The power sensor 22 outputs information of the measured PDU-related actual output power (hereinafter referred to as "PDU-related actual output power information") of the PDU 20 to the control device 100. The PDU-related actual output power is an example of "first actual output power" in the claims and the PDU-related actual output power information is an example of "first actual output power information" in the claims.

The VCU 40 is, for example, a DC-DC converter. The VCU 40 steps up a voltage of the electric power supplied (discharged) from the high-power type battery 50 to a voltage similar to a voltage when the high-capacity type battery 30 supplies electric power to the PDU 20 and outputs the electric power whose voltage has been stepped up to the PDU 20. The VCU 40 steps down a voltage of the electric power generated by the traveling motor 10 operated as a regenerative brake output by the PDU 20, outputs the electric power whose voltage has been stepped down to the high-power type battery 50, and causes the high-power type battery 50 to store (to be charged with) the electric power whose voltage has been stepped down. The VCU 40 is an example of the "power convertor" in the claims.

The power sensor 42 is attached to power wiring of the PDU 20 side in the VCU 40. A configuration of the power sensor 42 is similar to that of the power sensor 22. The power sensor 42 measures electric power from the high-power type battery 50 actually output to the PDU 20 by the VCU 40 (hereinafter referred to as "VCU-related actual output power") on the basis of a measured value of the measurement instrument. The power sensor 42 outputs information of the measured VCU-related actual output power (hereinafter referred to as "VCU-related actual output power information") of the VCU 40 to the control device 100. The VCU-related actual output power is an example of "second actual output power" in the claims and the VCU-related actual output power information is an example of "second actual output power information" in the claims.

The high-capacity type battery 30 and the high-power type battery 50 are batteries each including a secondary battery capable of repeating charging and discharging processes as a power storage unit such as a lithium-ion battery. Each of the high-capacity type battery 30 and the high-power type battery 50 may have a removable configuration that can be easily attached to and detached from the vehicle 1 such as a cassette-type battery pack or a stationary configuration that is not easily attached to and detached from the vehicle 1. For example, the high-capacity type battery 30 has a stationary configuration and the high-power type battery 50 has a removable configuration. The secondary battery provided in each of the high-capacity type battery 30 and the high-power type battery 50 is, for example, a lithium-ion battery. As the secondary battery provided in each of the high-capacity type battery 30 and the high-power type battery 50, for example, in addition to a lead storage battery, a nickel-hydrogen battery, a sodium-ion battery, and the like, a capacitor such as an electric double-layer capacitor or a composite battery in which a secondary battery and a capacitor are combined is conceivable, but the configuration of the secondary battery may be of any type. Each of the high-capacity type battery 30 and the high-power type battery 50 stores (is charged with) the electric power introduced from an external charger (not shown) of the vehicle 1 and is discharged to output the stored electric power for causing the vehicle 1 to travel. Each of the high-capacity type battery 30 and the high-power type battery 50 stores (is charged with) the electric power supplied via the PDU 20 or the VCU 40 and generated by the traveling motor 10 operated as a regenerative brake and is discharged so that the stored electric power is used for traveling (for example, acceleration) of the vehicle 1. The high-capacity type battery 30 is an example of a "first battery" in the claims and the high-power type battery 50 is an example of a "second battery" in the claims.

The battery sensor 32 is connected to the high-capacity type battery 30. The battery sensor 32 detects physical quantities such as the voltage, the current, and the temperature of the high-capacity type battery 30. The battery sensor 32 includes, for example, a voltage sensor, a current sensor, and a temperature sensor. The battery sensor 32 detects the voltage of the high-capacity type battery 30 using the voltage sensor, detects the current of the high-capacity type battery 30 using the current sensor, and detects the temperature of the high-capacity type battery 30 using the temperature sensor. The battery sensor 32 outputs information (hereinafter referred to as "high-capacity type battery information") such as the voltage value, the current value, and the temperature of the high-capacity type battery 30 that have been detected to the control device 100.

The power sensor 34 is attached to power wiring of the PDU 20 side in the high-capacity type battery 30. A configuration of the power sensor 34 is similar to those of the power sensor 22 and the power sensor 42. The power sensor 34 measures electric power actually output to the PDU 20 by the high-capacity type battery 30 (hereinafter referred to as "high-capacity type actual output power") on the basis of a measured value of the measurement instrument. The measurement instrument provided in the power sensor 34 may be the same as the voltage sensor or the current sensor provided in the battery sensor 32. The power sensor 34 outputs information of the measured high-capacity type actual output power of the high-capacity type battery 30 (hereinafter referred to as "high-capacity type actual output power information") to the control device 100. When only electric power output by the high-capacity type battery 30 is supplied to the traveling motor 10, the high-capacity type actual output power is also an example of the "first actual output power" in the claims and the high-capacity type actual output power information is also an example of the "first actual output power information" in the claims.

The battery sensor 52 is connected to the high-power type battery 50. The battery sensor 52 detects physical quantities such as the voltage, the current, and the temperature of the high-power type battery 50. The configuration of the battery sensor 52 is similar to that of the battery sensor 32. The battery sensor 52 outputs information (hereinafter referred to as "high-power type battery information") such as the voltage value, the current value, and the temperature of the high-power type battery 50 that have been detected to the control device 100.

The driving operation elements 70 include, for example, an accelerator pedal, a brake pedal, a shift lever, a steering wheel, a variant steering wheel, a joystick, and other operation elements. The driving operation element 70 is equipped with a sensor that detects whether or not the user (the driver) of the vehicle 1 has performed an operation on each operation element or the amount of operation. The driving operation element 70 outputs a detection result of the sensor to the control device 100. For example, an accelerator opening degree sensor is attached to the accelerator pedal, detects the amount of operation on the accelerator pedal by the driver and outputs the detected amount of operation as an accelerator opening degree to the control device 100. For example, a brake depression amount sensor is attached to the brake pedal, detects the amount of operation on the brake pedal by the driver, and outputs the detected amount of operation as the amount of brake depression to the control device 100. The accelerator opening degree is information for the driver to instruct (request) the control device 100 to supply electric power from the high-capacity type battery 30 or the high-power type battery 50 to the traveling motor 10 in the traveling of the vehicle 1. In other words, the accelerator opening degree is information indicating the amount of electric power to be supplied to the traveling motor 10 requested by the driver. The accelerator opening degree sensor is an example of "another control device" in the claims.

The vehicle sensor 80 detects the traveling state of the vehicle 1. For example, the vehicle sensor 80 includes a wheel speed sensor 82 that detects the wheel speed of each drive wheel 12 such as a rotational speed (the number of rotations) of each drive wheel 12 of the vehicle 1. For example, the wheel speed sensor 82 is attached to a portion of the axle to which each drive wheel 12 is connected and detects the wheel speed of each drive wheel 12 by detecting the number of rotations of the axle. The wheel speed sensor 82 outputs information (hereinafter referred to as "wheel speed information") indicating the detected wheel speed of each drive wheel 12 to the control device 100. The vehicle sensor 80 may include, for example, a vehicle speed sensor that detects the speed of the vehicle 1 or an acceleration sensor that detects the acceleration of the vehicle 1. The vehicle speed sensor may include, for example, a speed calculator, and the speed (the vehicle speed) of the vehicle 1 may be derived (detected) by integrating wheel speeds detected by wheel speed sensors 82 attached to drive wheels 12 of the vehicle 1. The vehicle sensor 80 may include, for example, a yaw rate sensor that detects the angular velocity around a vertical axis of the vehicle 1, a direction sensor that detects the direction of the vehicle 1, and the like. The vehicle sensor 80 outputs information (hereinafter referred to as "traveling state information") indicating the detected traveling state of the vehicle 1 to the control device 100. The traveling state information may include wheel speed information.

The auxiliary equipment 90 is in-vehicle equipment provided in the vehicle 1, such as an air conditioning device (a so-called air conditioner) or an accessory socket for power supply (a so-called cigar socket). The auxiliary equipment 90 may be, for example, a universal serial bus (USB) terminal, a commercial power outlet for operating a household electric appliance or a personal computer, or the like. The auxiliary equipment 90 is not equipment directly related to the traveling of the vehicle 1, but operates by consuming the electric power supplied from the high-power type battery 50 via the high-capacity type battery 30 or the VCU 40, i.e., is equipment that consumes electric power outside of the traveling motor 10. The auxiliary equipment 90 may include equipment that operates with electric power output by, for example, a battery (not shown) such as a lead storage battery (hereinafter referred to as a "lead battery") that is mounted in the vehicle 1 separately from the high-capacity type battery 30 and the high-power type battery 50.

The control device 100 controls running or operations of the PDU 20 and the VCU 40 in accordance with a detection result output by each sensor provided in the driving operation element 70, i.e., an operation on each operation element by the user (the driver) of the vehicle 1. For example, the control device 100 controls the running or operations of the PDU 20 and the VCU 40 in accordance with the accelerator opening degree detected by the accelerator opening degree sensor. At this time, the control device 100 controls the running or operations of the PDU 20 and the VCU 40, for example, in consideration of the gear ratio of the transmission mechanism controlled by the control device 100, the vehicle speed included in the traveling state information output by the vehicle sensor 80, and the like. Thereby, the control device 100 controls the amount of electric power that is supplied to the traveling motor 10, i.e., the driving force of the traveling motor 10.

The control device 100 may include, for example, separate control devices such as a motor controller, a PDU controller, a battery controller, and a VCU controller. For example, the control device 100 may be replaced with a control device such as a motor electronic control unit (ECU), a PDU-ECU, a battery ECU, or a VCU-ECU.

Each of the control device 100, the motor controller constituting the control device 100, the PDU controller, the battery controller, and the VCU controller may be implemented, for example, by a hardware processor such as a central processing unit (CPU) executing the program (software). Some or all of the functions of these components may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Some or all of the functions of these components may be implemented by a dedicated LSI circuit. The program may be pre-stored in a storage device (a storage device including a non-transitory storage medium) such as a hard disk drive (HDD) or a flash memory provided in the vehicle 1 or may be stored in a removable storage medium (a non-transitory storage medium) such as a DVD or a CD-ROM and installed in the HDD or the flash memory provided in the vehicle 1 when the storage medium is mounted in a drive device provided in the vehicle 1.

When the vehicle 1 travels, the control device 100 controls a discharging process on electric power from the high-capacity type battery 30, a charging process on electric power to the high-capacity type battery 30, a discharging process on electric power from the high-power type battery 50, and a charging process on electric power to the high-power type battery 50. In the normal traveling of the vehicle 1, the control device 100 causes the electric power to be output from the high-capacity type battery 30 to the PDU 20. Thereby, the vehicle 1 travels with the rotational power of the traveling motor 10 driven by electric power supplied (discharged) from the high-capacity type battery 30. Further, for example, when a large driving force of the traveling motor 10 is required for the vehicle 1 to travel such as when the vehicle 1 climbs a steep slope or accelerates, the control device 100 causes the VCU 40 to output electric power from the high-power type battery 50 to the PDU 20 if the supply of electric power exceeding an upper limit value of electric power capable of being output by the high-capacity type battery 30 (hereinafter referred to as an "upper power limit value") is necessary. That is, the control device 100 causes electric power output from the high-power type battery 50 to be added to electric power output from the high-capacity type battery 30. Thereby, the vehicle 1 travels with the rotational power of the traveling motor 10 driven by electric power obtained by combining the electric power supplied (discharged) from the high-capacity type battery 30 and the electric power supplied (discharged) from the high-power type battery 50. The upper power limit value of the high-capacity type battery 30 can be calculated on the basis of the high-capacity type battery information output by the battery sensor 32. More specifically, for example, it is possible to obtain a state of charge (SOC) indicating a charging state of the high-capacity type battery 30 on the basis of a voltage value and a current value included in the high-capacity type battery information and calculate an upper power limit value at a present time point in the high-capacity type battery 30 on the basis of the obtained SOC and information of a temperature included in the high-capacity type battery information. The upper power limit value of the high-power type battery 50 can also be similarly calculated. In the following description, the upper power limit value of the high-capacity type battery 30 is referred to as a "high-capacity type upper power limit value" and the upper power limit value of the high-power type battery 50 is referred to as a "high-power type upper power limit value". The high-capacity type upper power limit value is an example of a "first upper power limit value" in the claims and the high-power type upper power limit value is an example of a "second upper power limit value" in the claims.

The control device 100 may control a discharging process on electric power from each battery and a charging process on electric power to each battery on the basis of the traveling mode of the vehicle 1. In this case, the traveling mode of the vehicle 1 may be automatically switched by the control device 100 on the basis of the accelerator opening degree and the amount of brake depression output by the driving operation elements 70 and the traveling state information output by the vehicle sensor 80 or may be manually and intentionally switched by the driver using, for example, a traveling mode changeover switch (not shown) provided in the driving operation element 70. When the driver manually switches the traveling mode, the traveling mode changeover switch (not shown) outputs information of the traveling mode (hereinafter referred to as "traveling mode information") set (designated) by the driver to the control device 100.

In this way, the control device 100 controls the running or operations of the PDU 20 and the VCU 40 in accordance with the operation of the driving operation element 70 by the driver and causes the traveling motor 10 to be driven by causing electric power to be output from the high-capacity type battery 30 and the high-power type battery 50. The control device 100 is an example of a "vehicle control device" in the claims.

[Control of Supply of Electric Power to Traveling Motor]

Figure 2:
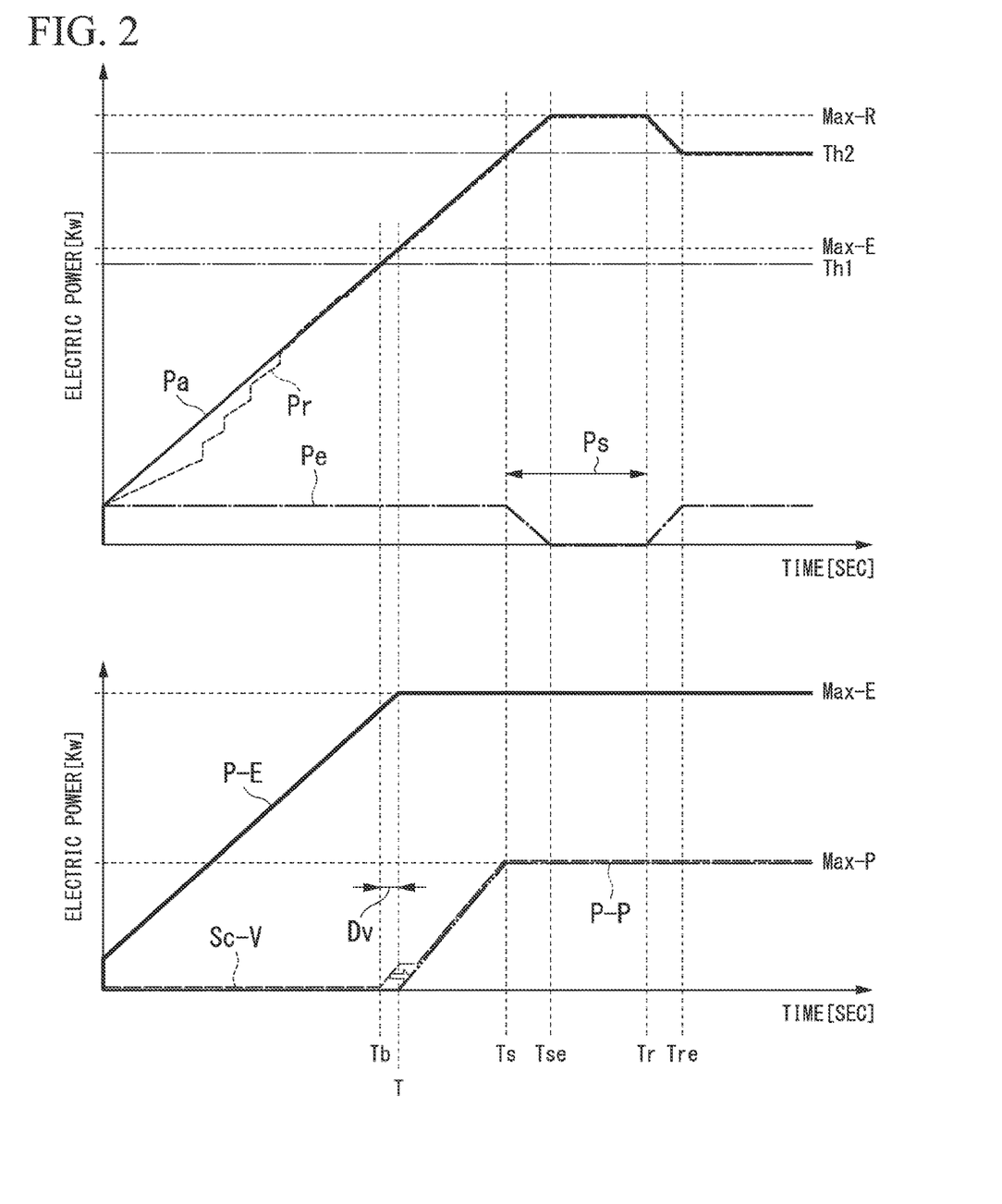
FIG. 2 is a diagram showing an example of a change in electric power supplied to a traveling motor according to control of a control device provided in the vehicle according to the embodiment.

FIG. 2 is a diagram showing an example of a change in electric power supplied to the traveling motor 10 according to control of the control device 100 provided in the vehicle 1 according to the embodiment. In FIG. 2, an example of a change in the electric power [kW] supplied to the traveling motor 10 is shown in the upper part of FIG. 2, an example of a change in electric power [kW] output by each battery is shown in the lower part of FIG. 2, and relationships between changes in electric power [kW] which changes every time [sec] according to the control of the control device 100 are associated.

The control device 100 outputs a power control signal for controlling the supply of electric power from the high-capacity type battery 30 or the high-power type battery 50 to the traveling motor 10 to the PDU 20 and the VCU 40 in response to the driver's request indicated by the accelerator opening degree. The power control signal is a signal for instructing the PDU 20 or the VCU 40 to perform power conversion. The control device 100 performs proportional (P), integral (I), and differential (D) control on the basis of, for example, a current wheel speed of the drive wheel 12 indicated in the wheel speed information output by the wheel speed sensor 82, a current speed (a vehicle speed) of the vehicle 1 indicated in the traveling state information output by the vehicle sensor 80, or the like and determines the operation or the parameter of an electric circuit such as a switching element provided in the PDU 20 or the VCU 40 to output indicated power from each battery. The control device 100 generates a power control signal representing content of the determined operation and parameter of the electric circuit and outputs the power control signal to the PDU 20 and the VCU 40. The power control signal is an example of "output instruction content" in the claims.

Incidentally, the electric power output from the high-capacity type battery 30 and the high-power type battery 50 passes through various electric circuits including the electric circuits provided in the PDU 20 and the VCU 40 while the electric power is supplied to the traveling motor 10. Further, in the traveling of the vehicle 1, the gear ratio of the transmission mechanism including the speed reducer 16 also changes. That is, in the vehicle 1, the efficiency in the electric circuit through which the electric power passes, the efficiency of the gear, and the like are related to the electric power supplied to the traveling motor 10, i.e., the traveling of the vehicle 1. Thus, in the vehicle 1, even if the control device 100 generates a power control signal for controlling electric power requested by the driver (hereinafter referred to as "requested power") indicated by the accelerator opening degree and outputs the generated power control signal to the PDU 20 or the VCU 40, electric power which is the same as the requested power (or in which the requested power is reflected) is not always supplied to the traveling motor 10. Therefore, the control device 100 corrects the next requested power on the basis of a difference between the PDU-related actual output power actually output to the traveling motor 10 (which may be the high-capacity type actual output power) and the requested power at that time, generates a power control signal for performing control so that the corrected requested power is supplied to the traveling motor 10, and outputs the generated power control signal to the PDU 20 or the VCU 40. In other words, when a power control signal indicating currently requested power (hereinafter referred to as "corrected requested power") is generated, the control device 100 performs feedback control based on previously requested power (hereinafter, referred to as "output requested power") indicated by a previously output power control signal and the PDU-related actual output power output in accordance with the output requested power in addition to PID control. The output requested power is an example of "first requested power" in the claims and the corrected requested power is an example of "second requested power" in the claims.

In the upper part of FIG. 2, an example in which the corrected requested power Pr is subjected to feedback control so that it approaches PDU-related actual output power Pa is shown. In the lower part of FIG. 2, an example in which output power P-E output from the high-capacity type battery 30 in accordance with the power control signal changes to a high-capacity type upper power limit value Max-E of the high-capacity type battery 30 is shown.

Further, the control device 100 causes electric power output from the high-power type battery 50 to be added to electric power output from the high-capacity type battery 30 at a timing when the electric power output by the high-capacity type battery 30 exceeds the high-capacity type upper power limit value. At this time, for example, when the high-power type battery 50 has not output electric power, even if the VCU 40 immediately starts an operation in response to the power control signal, electric power from the high-power type battery 50 is not always immediately output from the VCU 40 to the power wiring of the PDU 20 side. That is, even in the VCU 40, because the electric power output from the high-power type battery 50 passes through various electric circuits within the VCU 40, there is a delay until the electric power according to the power control signal is output from the VCU 40. Therefore, the control device 100 generates a power control signal for outputting the electric power from the high-power type battery 50 at a timing when the corrected requested power reaches a first threshold value in consideration of the delay of the power output in the VCU 40 and outputs the generated power control signal to the VCU 40. For the first threshold value, a low power value less than or equal to the high-capacity type upper power limit value Max-E is set on the basis of a delay time period until the electric power of the high-power type battery 50 is output from the VCU 40. At this time, when the corrected requested power is less than the high-capacity type upper power limit value in a case where the corrected requested power has reached the first threshold value, the control device 100 determines the operation or the parameter of the electric circuit provided in the VCU 40 so that difference power between the corrected requested power and the first threshold value is output from the VCU 40, generates a power control signal indicating the content of the determined operation or parameter of the electric circuit, and outputs the generated power control signal to the VCU 40. Subsequently, the control device 100 determines the operation or parameter of the electric circuit provided in the VCU 40 so that the difference power between the corrected requested power and the high-capacity type upper power limit value is output from the VCU 40 from a timing when the corrected requested power is consistent with the VCU-related actual output power (which may be electric power obtained by subtracting the high-capacity type actual output power from the PDU-related actual output power), generates a power control signal indicating content of the determined operation or parameter of the electric circuit, and output the generated power control signal to the VCU 40.

In the upper part of FIG. 2, an example in which electric power [kW] at a timing Tb that is a delay time Dv of the VCU 40 earlier than a timing T when the corrected requested power Pr exceeds (is consistent with) the high-capacity type upper power limit value Max-E is set to a first threshold value Th1 is shown. In the lower part of FIG. 2, an example in which the control device 100 outputs a power control signal Sc-V for the VCU 40 at the timing Tb is shown. Thereby, as shown in the lower part of FIG. 2, electric power from the high-power type battery 50 delayed by the delay time Dv from the power control signal Sc-V is output as output power P-P from the VCU 40. Further, in the lower part of FIG. 2, an example in which the control device 100 changes the power control signal Sc-V that is output to the VCU 40 at the timing T is shown. In the lower part of FIG. 2, an example in which the output power P-P that is output in accordance with the power control signal Sc-V changes to the high-power type upper power limit value Max-P of the high-power type battery 50 is shown.

Incidentally, when the vehicle 1 is traveling, for example, the output power P-E output from the high-capacity type battery 30 is also consumed by the auxiliary equipment 90 for purposes other than the traveling of the vehicle 1. In this case, electric power capable of being supplied to the traveling motor 10 for traveling of the vehicle 1 is not a maximum power value in the vehicle 1 obtained by combining the upper power limit values of the high-capacity type battery 30 and the high-power type battery 50. In other words, the upper power limit value (hereinafter referred to as a "required upper power limit value") of electric power capable of being supplied to the traveling motor 10 in accordance with the corrected requested power is a value obtained by subtracting electric power to be consumed outside of the traveling of the vehicle 1 by the auxiliary equipment 90 (hereinafter referred to as "out-of-traveling consumption power") from the maximum power value. In this case, for example, the performance of acceleration of the vehicle 1 will deteriorate. Therefore, when the vehicle 1 is traveling and the traveling motor 10 requires a larger driving force, the control device 100 causes electric power being supplied to the auxiliary equipment 90 to be stopped temporarily and causes more electric power to be supplied to the traveling motor 10. More specifically, the control device 100 can cause the electric power being supplied to the auxiliary equipment 90 to be temporarily stopped at the timing when the corrected requested power reaches a second threshold value and cause the electric power less than or equal to the maximum power value to be supplied to the traveling motor 10. The control device 100 may cause the electric power being supplied to the auxiliary equipment 90 to be reduced temporarily. In this case, the control device 100 may cause the electric power being supplied to a part of the auxiliary equipment 90 (for example, an air conditioner) to be stopped or may cause the total electric power being supplied to the auxiliary equipment 90 to be reduced. When the auxiliary equipment 90 operates with electric power output by a power converter that converts the electric power from the power wiring, for example, the control device 100 may cause the electric power being supplied to the power converter to be stopped temporarily. The second threshold value is used to set a power value obtained by subtracting the out-of-traveling consumption power in the auxiliary equipment 90 from the maximum power value of the vehicle 1. The out-of-traveling consumption power may be obtained, for example, by obtaining a sum of electric power of rated values of pieces of equipment provided in the auxiliary equipment 90 operated by the control device 100 or may be obtained from measured values of the power sensor (not shown) (for example, the measurement instruments such as the wattmeter, the voltmeter, and the ammeter) attached to the power wiring of the PDU 20 side in the auxiliary equipment 90. When the power sensor (not shown) is attached to the auxiliary equipment 90, the power sensor (not shown) outputs information of measured electric power actually consumed by the auxiliary equipment 90 as information of the out-of-traveling consumption power (hereinafter referred to as out-of-traveling consumption power information) to the control device 100.

The control device 100 may be configured to cause the electric power being supplied to the auxiliary equipment 90 to be stopped temporarily and cause more electric power to be supplied to the traveling motor 10 when the traveling mode of the vehicle 1 is, for example, a performance-priority traveling mode in which the performance of acceleration of the vehicle 1 or the like is prioritized. Thereby, the driver can experience (actually feel) a difference between the traveling performance of the normal traveling mode and the traveling performance of the performance-priority traveling mode in the vehicle 1. The performance-priority traveling mode is, for example, a traveling mode called a sports mode or the like.

When the auxiliary equipment 90 includes equipment that operates with electric power output by a lead battery (not shown), the control device 100 may cause the supply of electric power to the equipment to be stopped or reduced. However, the control device 100 may be configured to cause the supply of electric power to the equipment to be stopped or reduced in a case where the required upper power limit value is reduced when equipment operating with electric power from the lead battery (not shown) operates, for example, such as a case where the lead battery is charged with the electric power output from the high-capacity type battery 30 or the high-power type battery 50.

In the upper part of FIG. 2, an example in which electric power [kW] obtained by subtracting out-of-traveling consumption power Pe being consumed by the auxiliary equipment 90 from a required upper power limit value Max-R in the vehicle 1 is set to a second threshold value Th2 is shown. In the upper part of FIG. 2, an example in which the control device 100 causes electric power supplied to the auxiliary equipment 90 to be stopped at a timing Ts when the corrected requested power Pr exceeds the second threshold value Th2 and causes the supply of electric power to the auxiliary equipment 90 to be resumed (restored) at a timing Tr when a stop period Ps has elapsed is shown. Thereby, as shown in the upper part of FIG. 2, the out-of-traveling consumption power Pe starts to decrease from the timing Ts and becomes, for example, 0 [kW] at a timing Tse and the out-of-traveling consumption power Pe starts to increase from the timing Tr when the stop period Ps has elapsed and returns to, for example, electric power [kW] of original out-of-traveling consumption power Pe at a timing Tre. The stop period Ps is a time period during which the driver does not feel inconvenience even if the auxiliary equipment 90 stops (for example, the driver does not feel uncomfortable even if the air conditioner stops). The stop period Ps is, for example, 10 [sec].

In FIG. 2, a case where the control device 100 resumes the supply of electric power to the auxiliary equipment 90 at the timing Tr when the stop period Ps has elapsed, i.e., a case where a period during which the operation of the auxiliary equipment 90 is stopped or restricted is a period from the timing Ts to the timing Tre, is shown. However, the control device 100 may control the supply of electric power to the auxiliary equipment 90 so that the period during which the operation of the auxiliary equipment 90 is stopped or restricted becomes the stop period Ps. In this case, for example, it is only necessary for the control device 100 to perform control so that the supply of electric power to the auxiliary equipment 90 is resumed by advancing a resumption timing by a required time period from the time when the supply of electric power to the auxiliary equipment 90 is resumed to the time when the operation of the auxiliary equipment 90 is restored (a period between the timing Tr and the timing Tre in the upper part of FIG. 2). The timing for resuming the supply of electric power to the auxiliary equipment 90 (restoring the operation of the auxiliary equipment 90) is not limited to a timing at which a prescribed stop period has elapsed. For example, the control device 100 may resume the supply of electric power to the auxiliary equipment 90 at a timing when the corrected requested power is less than the second threshold value. For example, the control device 100 may be configured to cause the supply of electric power to the auxiliary equipment 90 to be resumed at a timing when the traveling mode of the vehicle 1 is switched from the performance-priority traveling mode to a traveling mode such as a normal traveling mode other than the performance-priority traveling mode. For example, the control device 100 may be configured to cause the supply of electric power to the auxiliary equipment 90 to be resumed at a timing when the voltage output by the lead battery (not shown) is less than a prescribed value (for example, 11 [V]).

In this way, the control device 100 causes electric power in which corrected requested power is reflected more accurately to be supplied from the high-capacity type battery 30 or the high-power type battery 50 to the traveling motor 10 by performing feedback control based on the output requested power and the PDU-related actual output power output in accordance with the output requested power in addition to the PID control. Thereby, the control device 100 can perform control so that the electric power from the high-power type battery 50 is output to the VCU 40 by accurately ascertaining a more suitable timing when the electric power output from the high-power type battery 50 is added to the electric power output from the high-capacity type battery 30 (more specifically, a timing when the electric power output by the high-capacity type battery 30 exceeds the high-capacity type upper power limit value in accordance with the corrected requested power). Further, the control device 100 can cause electric power less than or equal to the required upper power limit value to be supplied to the traveling motor 10 so that electric power according to the corrected requested power is not decreased by an amount of out-of-traveling consumption power by temporarily stopping electric power to be supplied to the auxiliary equipment 90 at a more suitable timing (more specifically, a timing when it exceeds the second threshold value).

[Configuration of Control Device]

Figure 3:
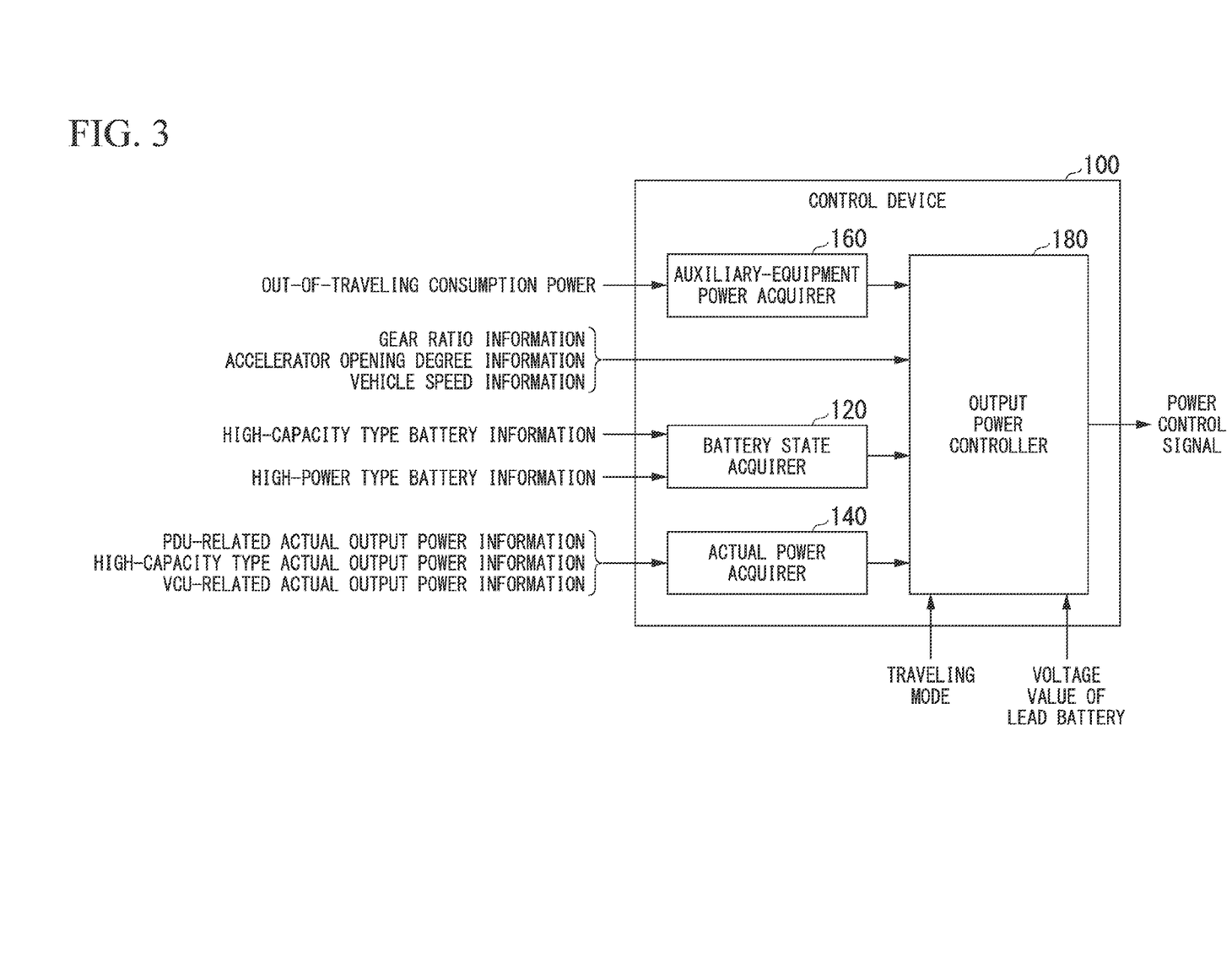
FIG. 3 is a diagram showing an example of a configuration of the control device provided in the vehicle according to the embodiment.

FIG. 3 is a diagram showing an example of a configuration of the control device 100 provided in the vehicle 1 according to the embodiment. The control device 100 includes, for example, a battery state acquirer 120, an actual power acquirer 140, an auxiliary-equipment power acquirer 160, and an output power controller 180. FIG. 3 shows components of the control device 100 related to the control of the electric power supplied to the traveling motor 10.

The battery state acquirer 120 acquires high-capacity type battery information output by the battery sensor 32 and high-power type battery information output by the battery sensor 52. The battery state acquirer 120 outputs the acquired high-capacity type battery information and the acquired high-power type battery information to the output power controller 180. The battery state acquirer 120 is an example of a "first acquirer" in the claims.

The actual power acquirer 140 acquires PDU-related actual output power information output by the power sensor 22, high-capacity type actual output power information output by the power sensor 34, and VCU-related actual output power information output by the power sensor 42. The actual power acquirer 140 outputs the acquired PDU-related actual output power information, high-capacity type actual output power information, and VCU-related actual output power information to the output power controller 180. The actual power acquirer 140 is an example of a "second acquirer" in the claims.

The auxiliary-equipment power acquirer 160 acquires electric power to be consumed by the auxiliary equipment 90 (out-of-traveling consumption power). When a power sensor (not shown) is attached to the auxiliary equipment 90, the auxiliary-equipment power acquirer 160 acquires the out-of-traveling consumption power information output by the power sensor (not shown). For example, the auxiliary-equipment power acquirer 160 outputs information such as whether the auxiliary equipment 90 is turned on or off, information indicating a current use state of the auxiliary equipment 90, and information of the acquired out-of-traveling consumption power to the output power controller 180. The auxiliary-equipment power acquirer 160 is an example of a "third acquirer" in the claims.

The output power controller 180 controls electric power that is output (supplied) from the PDU 20 to the traveling motor 10 on the basis of information of the gear ratio of the transmission mechanism, information of the accelerator opening degree, information of the vehicle speed, and the like. At this time, the output power controller 180 calculates a current SOC of each battery on the basis of the high-capacity type battery information and the high-power type battery information output by the battery state acquirer 120 and further calculates the upper power limit value in each battery. More specifically, the output power controller 180 calculates the current SOC (a high-capacity type battery-specific SOC) of the high-capacity type battery 30 on the basis of a voltage value and a current value included in the high-capacity type battery information and calculates a high-capacity type upper power limit value of the high-capacity type battery 30 on the basis of the calculated high-capacity type battery-specific SOC and the temperature information included in the high-capacity type battery information. Further, the output power controller 180 calculates the current SOC (a high-power type battery-specific SOC) of the high-power type battery 50 on the basis of a voltage value and a current value included in the high-power type battery information and calculates a high-power type upper power limit value of the high-power type battery 50 on the basis of the calculated high-power type battery-specific SOC and the temperature information included in the high-power type battery information. The output power controller 180 may further calculate the high-capacity type upper power limit value and the high-power type upper power limit value using an internal resistance value of the corresponding battery included in the battery information. Each of the high-capacity type battery-specific SOC and the high-power type battery-specific SOC may be calculated by the battery state acquirer 120, included in the high-capacity type battery information and the high-power type battery information, and output to the output power controller 180. Subsequently, the output power controller 180 determines electric power to be output (supplied) from the PDU 20 to the traveling motor 10 by converting the electric power output by the high-capacity type battery 30 or the electric power output by the high-capacity type battery 30 and the high-power type battery 50 on the basis of the calculated high-capacity type upper power limit value, the calculated high-power type upper power limit value, and the requested power indicated by the accelerator opening degree.

The output power controller 180 corrects currently determined electric power on the basis of a difference between the PDU-related actual output power indicated in the PDU-related actual output power information output by the actual power acquirer 140 and the corrected requested power at that time (i.e., the output requested power corrected and output after the determination is made in accordance with requested power indicated by the previous accelerator opening degree) and designates the corrected electric power as the corrected requested power. More specifically, the output power controller 180 performs correction so that the currently determined electric power increases when the PDU-related actual output power output in accordance with the output requested power is lower than the output requested power, performs correction so that the currently determined electric power decreases when the PDU-related actual output power output in accordance with the output requested power is higher than the output requested power, and designates a correction result as the corrected requested power. At this time, the correction amount for performing correction by increasing or decreasing the currently determined electric power in the output power controller 180 is not particularly limited. For example, the correction amount may be an amount of electric power equal to ½ of the difference between the PDU-related actual output power and the output requested power, a prescribed amount of electric power, or an amount of electric power based on another concept.

The output power controller 180 determines whether or not the corrected requested power is electric power greater than or equal to the first threshold value. When the corrected requested power is not electric power greater than or equal to the first threshold value (when the corrected requested power is electric power less than the first threshold value), the output power controller 180 generates a power control signal for outputting the corrected requested power from the high-capacity type battery 30 and outputs the generated power control signal to the PDU 20. In this case, the output power controller 180 may generate a power control signal for preventing electric power from being output from the high-power type battery 50 and output the generated power control signal to the VCU 40. On the other hand, when the corrected requested power is electric power greater than or equal to the first threshold value, the output power controller 180 generates a power control signal for outputting the corrected requested power less than or equal to the high-capacity type upper power limit value from the high-capacity type battery 30 and further outputting the corrected requested power equivalent to an amount exceeding the first threshold value from the high-power type battery 50. At this time, when the corrected requested power is less than the high-capacity type upper power limit value, the output power controller 180 generates a power control signal for outputting electric power obtained by subtracting the first threshold value from the corrected requested power from the high-power type battery 50 and outputting electric power obtained by subtracting the high-capacity type upper power limit value from the corrected requested power from the high-power type battery 50 from the time when the corrected requested power is consistent with the VCU-related actual output power. The output power controller 180 outputs the generated power control signal to the PDU 20 and the VCU 40.

Further, the output power controller 180 determines whether or not the corrected requested power is electric power greater than or equal to the second threshold value. When the corrected requested power is not electric power greater than or equal to the second threshold value, the output power controller 180 does not particularly perform any additional control. Here, for example, when the output power controller 180 performs control for supplying electric power to the auxiliary equipment 90 with respect to the high-capacity type battery 30, the VCU 40, and the high-power type battery 50, the fact that "additional control is not performed" indicates that this control is continued. On the other hand, when the corrected requested power is electric power greater than or equal to the second threshold value, the output power controller 180 causes the operation of the auxiliary equipment 90 to be stopped or restricted. At this time, the output power controller 180 also causes the operation of the auxiliary equipment 90 to be stopped or restricted in consideration of the traveling mode of the vehicle 1 and the voltage value of the lead battery (not shown). When the operation of the auxiliary equipment 90 is stopped, the output power controller 180 generates a power control signal for setting the electric power to be supplied to the auxiliary equipment 90 to zero and outputs the generated power control signal to, for example, the VCU 40 and/or the auxiliary equipment 90. When the operation of the auxiliary equipment 90 is restricted, the output power controller 180 calculates electric power capable of being supplied to the auxiliary equipment 90 (hereinafter referred to as "auxiliary equipment-specific supply power"), generates a power control signal indicating the calculated auxiliary equipment-specific supply power, and outputs the generated power control signal to, for example, the VCU 40 and/or the auxiliary equipment 90. The auxiliary equipment-specific supply power is, for example, prescribed electric power or electric power obtained by subtracting electric power (hereinafter referred to as "limited power") obtained by subtracting the second threshold value from the corrected requested power from out-of-traveling consumption power. After the operation of the auxiliary equipment 90 is stopped or restricted, for example, the output power controller 180 starts an operation of a timer (not shown) and waits for the stop period to elapse. When the stop period has elapsed, the output power controller 180 generates a power control signal for resuming the supply of electric power to the auxiliary equipment 90, and outputs the generated power control signal to, for example, the VCU 40 and/or the auxiliary equipment 90. For example, the power control signal for resuming the supply of electric power to the auxiliary equipment 90 may indicate the out-of-traveling consumption power before the operation is stopped or restricted as the auxiliary equipment-specific supply power or may indicate the auxiliary equipment-specific supply power obtained by adding the limited power to the current out-of-traveling consumption power after the operation is stopped or restricted. Thereby, the corrected requested power for traveling of the vehicle 1 becomes at least electric power obtained by subtracting the out-of-traveling consumption power from the maximum power value, i.e., the second threshold value. Thus, the output power controller 180 generates at least a power control signal indicating the corrected requested power and outputs the generated power control signal to the PDU 20 and the VCU 40.

[Process of Control Device]

Figure 4:
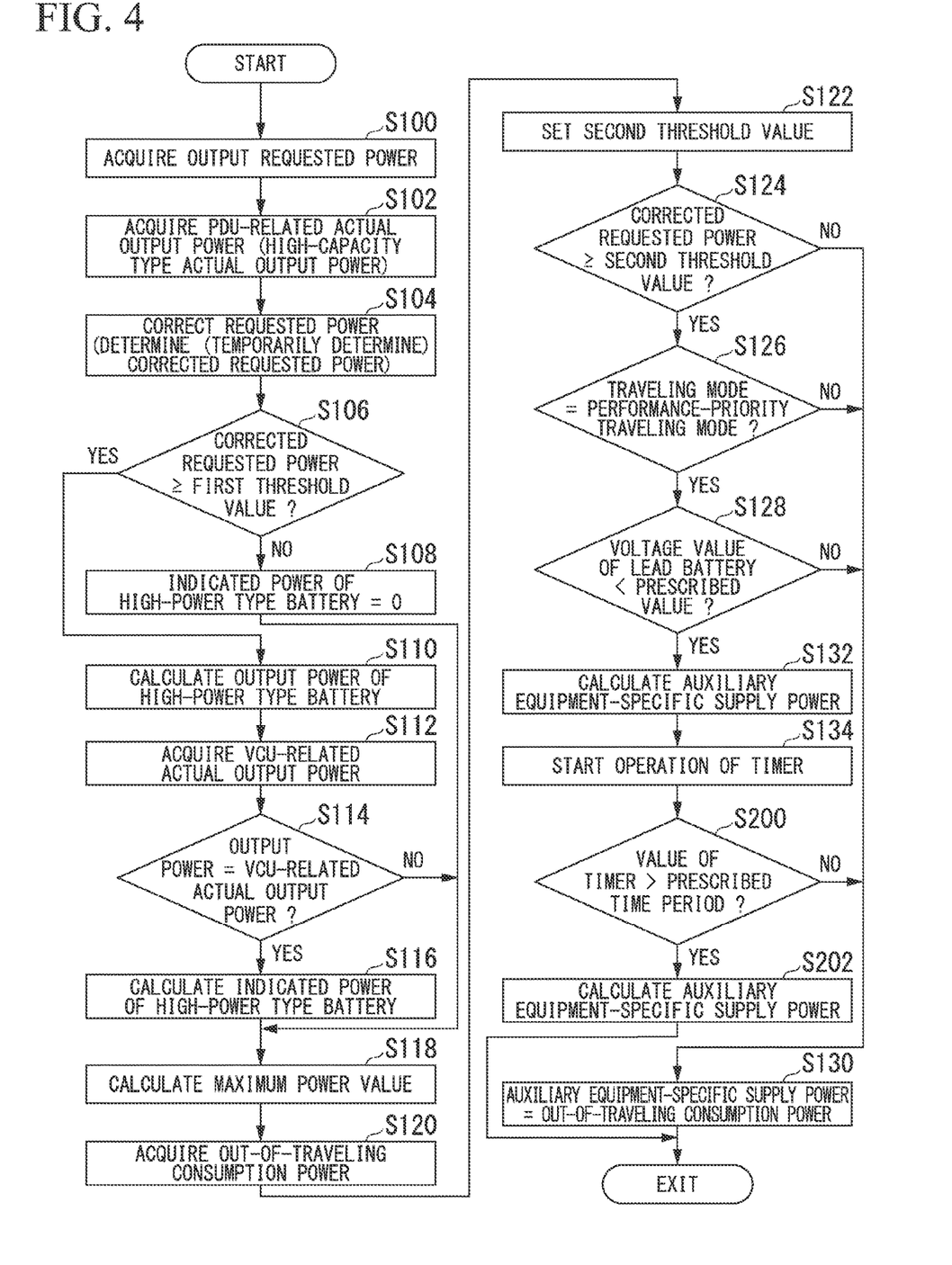
FIG. 4 is a flowchart showing an example of a flow of a process executed when electric power to be output to a traveling motor is controlled in the control device provided in the vehicle according to an embodiment.

FIG. 4 is a flowchart showing an example of a flow of a process executed when electric power to be output to the traveling motor 10 is controlled in the control device 100 provided in the vehicle 1 according to the embodiment. The process of the present flowchart is iteratively executed while the vehicle 1 is traveling. In the following description, it is assumed that at least previously output requested power is stored in a storage device (not shown) provided in the control device 100, such as a register, a static random-access memory (SRAM), or a dynamic random-access memory (DRAM).

When the accelerator opening degree is input from the driving operation element 70, the control device 100 starts a process of generating a power control signal according to requested power indicated by the input accelerator opening degree and outputting the generated power control signal to the PDU 20, the VCU 40, and the auxiliary equipment 90. When the process of generating the power control signal is started, the battery state acquirer 120 acquires the high-capacity type battery information output by the battery sensor 32 and outputs the high-capacity type battery information to the output power controller 180. Thereby, the output power controller 180 calculates the high-capacity type upper power limit value. Further, the battery state acquirer 120 acquires the high-power type battery information output by the battery sensor 52 and outputs the high-power type battery information to the output power controller 180. Thereby, the output power controller 180 calculates the high-power type upper power limit value. The output power controller 180 determines the electric power to be output (supplied) to the traveling motor 10 on the basis of the calculated high-capacity type upper power limit value, the calculated high-power type upper power limit value and the requested power indicated by the input accelerator opening degree.

Subsequently, the output power controller 180 acquires the output requested power stored in the storage device (not shown) (step S100).

The actual power acquirer 140 acquires PDU-related actual output power information (which may be high-capacity type actual output power information) (step S102). The actual power acquirer 140 outputs the acquired PDU-related actual output power information (high-capacity type actual output power information) to the output power controller 180.

The output power controller 180 corrects electric power to be output to the traveling motor 10 currently determined on the basis of the acquired output requested power and the PDU-related actual output power (high-capacity type actual output power) output by the actual power acquirer 140 and determines (temporarily determines) corrected requested power (step S104).

The output power controller 180 determines whether or not the corrected requested power is electric power greater than or equal to the first threshold value (step S106). When it is determined that the corrected requested power is not electric power greater than or equal to the first threshold value in step S106, the output power controller 180 sets indicated power indicating electric power to be output from the high-power type battery 50 to zero (step S108). That is, the output power controller 180 does not cause electric power to be output from the high-power type battery 50. The output power controller 180 moves the process to step S118.

On the other hand, when it is determined that the corrected requested power is electric power greater than or equal to the first threshold value in step S106, the output power controller 180 calculates electric power (output power) to be output from the high-power type battery 50 (step S110). In step S110, the output power controller 180 calculates electric power obtained by subtracting the first threshold value from the corrected requested power as the output power of the high-power type battery 50.

The actual power acquirer 140 acquires VCU-related actual output power information (step S112). The actual power acquirer 140 outputs the acquired VCU-related actual output power information to the output power controller 180.

The output power controller 180 determines whether or not the calculated output power of the high-power type battery 50 is consistent with the VCU-related actual output power output by the actual power acquirer 140 (step S114). When it is determined that the output power of the high-power type battery 50 is not consistent with the VCU-related actual output power in step S114, the output power controller 180 moves the process to step S118.

On the other hand, when it is determined that the output power of the high-power type battery 50 is consistent with the VCU-related actual output power in step S114, the output power controller 180 calculates indicated power of the high-power type battery 50 (step S116). In step S116, the output power controller 180 calculates electric power obtained by subtracting the high-capacity type actual output power from the corrected requested power as the indicated power of the high-power type battery 50.

The output power controller 180 calculates a maximum power value in the vehicle 1 on the basis of the high-capacity type upper power limit value and the high-power type upper power limit value (step S118). In step S118, the output power controller 180 calculates the maximum power value by adding the high-capacity type upper power limit value to the high-power type upper power limit value. At this time, the output power controller 180 may cause the battery state acquirer 120 to re-acquire the high-capacity type battery information and the high-power type battery information and calculate the maximum power value after resetting the high-capacity type upper power limit value and the high-power type upper power limit value.

The auxiliary-equipment power acquirer 160 acquires out-of-traveling consumption power (step S120). The auxiliary-equipment power acquirer 160 outputs out-of-traveling consumption power information representing the acquired out-of-traveling consumption power to the output power controller 180.

The output power controller 180 sets the second threshold value on the basis of the calculated maximum power value and the out-of-traveling consumption power output by the auxiliary-equipment power acquirer 160 (step S122). In step S122, the output power controller 180 sets a power value obtained by subtracting the out-of-traveling consumption power from the maximum power value as the second threshold value.

The output power controller 180 determines whether or not the corrected requested power is electric power greater than or equal to the second threshold value (step S124). When it is determined that the corrected requested power is not electric power greater than or equal to the second threshold value in step S124, the output power controller 180 determines not to stop or restrict the operation of the auxiliary equipment 90. On the other hand, when it is determined that the corrected requested power is electric power greater than or equal to the second threshold value in step S124, the output power controller 180 determines whether or not the traveling mode of the vehicle 1 is a performance-priority traveling mode (step S126). When it is determined that the traveling mode of the vehicle 1 is not the performance-priority traveling mode in step S126, the output power controller 180 determines not to stop or restrict the operation of the auxiliary equipment 90. On the other hand, when it is determined that the traveling mode of the vehicle 1 is the performance-priority traveling mode in step S126, the output power controller 180 determines whether or not a voltage value of the lead battery (not shown) is less than a prescribed value (for example, 11 [V]) (step S128). When it is determined that the voltage value of the lead battery (not shown) is not less than the prescribed value in step S128, the output power controller 180 determines not to stop or restrict the operation of the auxiliary equipment 90. When it is determined not to stop or restrict the operation of the auxiliary equipment 90 in the processing of any one of steps S124, S126, and S128, the output power controller 180 does not change the auxiliary equipment-specific supply power indicating electric power to be supplied to the auxiliary equipment 90, i.e., maintains current out-of-traveling consumption power (step S130). The output power controller 180 ends the current process.

On the other hand, when it is determined that the voltage value of the lead battery (not shown) is less than the prescribed value in step S128, the output power controller 180 determines to stop or restrict the operation of the auxiliary equipment 90. The output power controller 180 calculates the auxiliary equipment-specific supply power (step S132). In step S132, the output power controller 180 calculates electric power obtained by subtracting the limited power from the out-of-traveling consumption power as the auxiliary equipment-specific supply power. The output power controller 180 generates a power control signal for outputting the corrected requested power less than or equal to the high-capacity type upper power limit value from the high-capacity type battery 30 and outputting the indicated power calculated in step S116 from the high-power type battery 50 and outputs the generated power control signal to the PDU 20 and the VCU 40. Further, the output power controller 180 generates a power control signal indicating the auxiliary equipment-specific supply power calculated in step S132 and outputs the generated power control signal to the auxiliary equipment 90 (as well as the PDU 20 and/or the VCU 40).

The output power controller 180 causes the operation of the timer (not shown) to be started (step S134).

The output power controller 180 confirms whether or not a prescribed time period has elapsed during the operation of the timer (not shown) (step S200). When it is confirmed that the prescribed time period has not elapsed in step S200, the output power controller 180 moves the process to step S130. On the other hand, when it is confirmed that the prescribed time period has elapsed in step S200, the output power controller 180 determines to resume (restore) the operation of the auxiliary equipment 90. The output power controller 180 calculates the auxiliary equipment-specific supply power for restoring the operation of the auxiliary equipment 90 (step S202). In step S202, the output power controller 180 calculates electric power obtained by adding the limited power to the out-of-traveling consumption power as the auxiliary equipment-specific supply power. The output power controller 180 generates a power control signal indicating the auxiliary equipment-specific supply power calculated in step S202 and outputs the generated power control signal to the auxiliary equipment 90 (as well as the high-capacity type battery 30 and/or the VCU 40). Further, the output power controller 180 generates a power control signal for outputting electric power less than or equal to the high-capacity type upper power limit value from the high-capacity type battery 30 and outputting electric power less than or equal to the second threshold value from the high-power type battery 50 and outputs the generated power control signal to the PDU 20 and the VCU 40.

According to the flow of the above-described process, the control device 100 corrects the requested power indicated by the input accelerator opening degree by performing feedback control. Thereby, the control device 100 more accurately ascertains a timing when electric power output from the high-power type battery 50 is added to electric power output from the high-capacity type battery 30. That is, the control device 100 more accurately ascertains a timing at which the high-capacity type upper power limit value for maximizing the performance for outputting electric power of the high-capacity type battery 30 is reached. The control device 100 generates a power control signal indicating the corrected requested power that has been corrected at a suitable timing, outputs the generated power control signal to the PDU 20 and the VCU 40, and causes electric power to be supplied to the traveling motor 10. Further, the control device 100 more accurately ascertains a timing at which the corrected requested power is included in a region of electric power to be used by the auxiliary equipment 90. That is, the control device 100 causes the electric power being supplied to the auxiliary equipment 90 to be stopped or limited temporarily and more accurately ascertains a suitable timing to be controlled so that the electric power less than or equal to the maximum power value is supplied to the traveling motor 10. The control device 100 generates a power control signal for stopping or limiting electric power being supplied to the auxiliary equipment 90 at the ascertained suitable timing, outputs the generated power control signal to the auxiliary equipment 90 (as well as the PDU 20 and/or the VCU 40), and causes the electric power to be supplied to the traveling motor 10. Thereby, in the vehicle 1 equipped with the control device 100, the performance for outputting the electric power in the high-capacity type battery 30 and the high-power type battery 50 can be maximized and traveling can be performed.

As described above, according to the vehicle 1 of the embodiment, the control device 100 causes electric power to be output from each battery at a suitable timing in a control process of supplying electric power to the traveling motor 10. Thereby, in the vehicle 1 of the embodiment, a traveling process of maximizing the performance for outputting electric power in each battery can be performed in a state in which the number of factors that accelerate the deterioration in which each battery mounted in the vehicle 1 is in an over-discharged state or the like is reduced.

According to the above-described embodiment, the vehicle 1 includes the battery state acquirer 120 configured to acquire a state of a high-capacity type battery 30 and a state of a high-power type battery 50; the actual power acquirer 140 configured to acquire at least high-capacity type actual output power information indicating information of high-capacity type actual output power that is actual output power actually output by the high-capacity type battery 30; and the output power controller 180 configured to calculate a high-capacity type upper power limit value that is an upper power limit value of the high-capacity type battery 30 on the basis of the state of the high-capacity type battery 30, calculate a high-power type upper power limit value of the high-power type battery 50 that is an upper power limit value on the basis of the state of the high-power type battery 50, and control a power conversion process of a power convertor (the PDU 20 and/or the VCU 40) for converting electric power output by the high-capacity type battery 30 or electric power output by the high-capacity type battery 30 and the high-power type battery 50 into electric power to be output to the traveling motor 10 on the basis of the calculated high-capacity type upper power limit value, the calculated high-power type upper power limit value, requested power to be output to the traveling motor 10 for outputting motive power for traveling requested from another control device (the driving operation element 70 and/or the accelerator opening degree sensor) of a vehicle, and the high-capacity type actual output power indicated in the high-capacity type actual output power information, wherein, when output instruction content (a power control signal) for iteratively issuing an instruction for the power conversion process in the power convertor is determined, the output power controller 180 obtains second requested power (corrected requested power) obtained by correcting currently requested power on the basis of a difference between first requested power (output requested power) that is previously requested power and the high-capacity type actual output power output in accordance with the first requested power and determines the output instruction content so that the second requested power is output from the high-capacity type battery 30. In the vehicle 1 in which two types of batteries are combined, a suitable timing when electric power output from the high-power type battery 50 is added to electric power output from the high-capacity type battery 30 can be obtained. Thereby, in the vehicle 1 of the embodiment, the number of factors of deterioration of the battery can be reduced and the traveling process of maximizing the performance for outputting the electric power in the battery can be performed, so that the commercial value of the vehicle 1 can be enhanced.

The embodiment described above can be represented as follows.

A vehicle control device including:

a hardware processor, and a storage device storing a program, wherein the hardware processor reads and executes the program stored in the storage device to:

acquire a state of a first battery and a state of a second battery;

acquire at least first actual output power information indicating first actual output power that is actual output power actually output by the first battery;

calculate a first upper power limit value that is an upper power limit value of the first battery based on the state of the first battery;

calculate a second upper power limit value of the second battery that is an upper power limit value of the second battery based on the state of the second battery; and control a power conversion process of a power convertor for converting electric power output by the first battery or electric power output by the first battery and the second battery into electric power to be output to a motor based on the calculated first upper power limit value, the calculated second upper power limit value, requested power to be output to the motor for outputting motive power for traveling requested from another control device of a vehicle, and the first actual output power indicated in the first actual output power information; and when output instruction content for iteratively issuing an instruction for the power conversion process in the power convertor is determined, calculating second requested power obtained by correcting currently requested power based on a difference between first requested power that is previously requested power and the first actual output power output in accordance with the first requested power and determine the output instruction content to cause the first battery to output the second requested power.

Although modes for carrying out the present invention have been described using embodiments, the present invention is not limited to the embodiments, and various modifications and substitutions can also be made without departing from the scope and spirit of the present invention.

What is claimed is:

1. A vehicle control device comprising a processor configured to execute computer-readable instructions to perform:

acquiring a state of a first battery and a state of a second battery;

acquiring at least first actual output power information indicating first actual output power that is actual output power actually output by the first battery;

calculating a first upper power limit value that is an upper power limit value of the first battery based on the state of the first battery;

calculating a second upper power limit value that is an upper power limit value of the second battery based on the state of the second battery; and controlling a power conversion process of a power convertor for converting electric power output by the first battery or electric power output by the first battery and the second battery into electric power to be output to a motor based on the calculated first upper power limit value, the calculated second upper power limit value, requested power to be output to the motor for outputting motive power for traveling requested from another control device of a vehicle, and the first actual output power indicated in the first actual output power information, wherein the controlling of the power conversion process comprises, when output instruction content for iteratively issuing an instruction for the power conversion process in the power convertor is determined, calculating second requested power obtained by correcting currently requested power based on a difference between first requested power that is previously requested power and the first actual output power output in accordance with the first requested power and determining the output instruction content to cause the first battery to output the second requested power, wherein the first battery is a high-capacity and low-power battery and the second battery is a battery having lower capacity and higher power than the first battery, and wherein the controlling of the power conversion process comprises determining the output instruction content to further cause the second battery to output electric power to be added to the electric power output by the first battery at a timing when the second requested power reaches a first threshold value less than the first upper power limit value.

2. The vehicle control device according to claim 1, wherein the processor is configured to execute the computer-readable instructions to perform:

acquiring second actual output power information indicating second actual output power that is actual output power actually output by the second battery, when the second requested power has reached the first threshold value, determining the output instruction content to cause the second battery to output difference power between the second requested power and the first threshold value if the second requested power is less than the first upper power limit value, and determining the output instruction content to cause the second battery to output the difference power between the second requested power and the first upper power limit value after the difference power between the second requested power and the first threshold value is consistent with the second actual output power indicated in the second actual output power information.

3. The vehicle control device according to claim 2, wherein the processor is configured to execute the computer-readable instructions to perform:

causing supply of electric power to equipment that consumes electric power outside of the motor to be stopped at a timing when the second requested power reaches a second threshold value less than a maximum power value obtained by combining the first upper power limit value and the second upper power limit value.

4. The vehicle control device according to claim 3, wherein the processor is configured to execute the computer-readable instructions to perform:

acquiring out-of-traveling consumption power that is electric power to be consumed outside of the motor, wherein the second threshold value is a value obtained by subtracting the out-of-traveling consumption power from the maximum power value.

5. The vehicle control device according to claim 4, wherein the processor is configured to execute the computer-readable instructions to perform:

controlling conversion of electric power output from the second battery in the power convertor to make the second requested power be at least the second threshold value and causing the supply of the electric power to the equipment to be restored at a timing when a prescribed time period has elapsed from the time when the supply of the electric power to the equipment was stopped.

6. The vehicle control device according to claim 1, wherein the processor is configured to execute the computer-readable instructions to perform:

causing supply of electric power to equipment that consumes electric power outside of the motor to be stopped at a timing when the second requested power reaches a second threshold value less than a maximum power value obtained by combining the first upper power limit value and the second upper power limit value.

7. The vehicle control device according to claim 6, wherein the processor is configured to execute the computer-readable instructions to perform:

acquiring out-of-traveling consumption power that is electric power to be consumed outside of the motor, wherein the second threshold value is a value obtained by subtracting the out-of-traveling consumption power from the maximum power value.

8. The vehicle control device according to claim 7, wherein the processor is configured to execute the computer-readable instructions to perform:

controlling conversion of electric power output from the second battery in the power convertor to make the second requested power be at least the second threshold value and causing the supply of the electric power to the equipment to be restored at a timing when a prescribed time period has elapsed from the time when the supply of the electric power to the equipment was stopped.

9. A vehicle control method comprising:

acquiring, by a computer, a state of a first battery and a state of a second battery;

acquiring, by the computer, at least first actual output power information indicating first actual output power that is actual output power actually output by the first battery;

calculating, by the computer, a first upper power limit value that is an upper power limit value of the first battery based on the state of the first battery;

calculating, by the computer, a second upper power limit value of the second battery that is an upper power limit value of the second battery based on the state of the second battery; and controlling, by the computer, a power conversion process of a power convertor for converting electric power output by the first battery or electric power output by the first battery and the second battery into electric power to be output to a motor based on the calculated first upper power limit value, the calculated second upper power limit value, requested power to be output to the motor for outputting motive power for traveling requested from another control device of a vehicle, and the first actual output power indicated in the first actual output power information; and when output instruction content for iteratively issuing an instruction for the power conversion process in the power convertor is determined, calculating, by the computer, second requested power obtained by correcting currently requested power based on a difference between first requested power that is previously requested power and the first actual output power output in accordance with the first requested power and determining the output instruction content to cause the first battery to output the second requested power, wherein the first battery is a high-capacity and low-power battery and the second battery is a battery having lower capacity and higher power than the first battery, and wherein the controlling of the power conversion process comprises determining the output instruction content to further cause the second battery to output electric power to be added to the electric power output by the first battery at a timing when the second requested power reaches a first threshold value less than the first upper power limit value.

10. A non-transitory computer-readable storage medium storing a program for causing a computer to:

acquire a state of a first battery and a state of a second battery;

acquire at least first actual output power information indicating first actual output power that is actual output power actually output by the first battery;

calculate a first upper power limit value that is an upper power limit value of the first battery based on the state of the first battery;

calculate a second upper power limit value that is an upper power limit value of the second battery based on the state of the second battery; and control a power conversion process of a power convertor for converting electric power output by the first battery or electric power output by the first battery and the second battery into electric power to be output to a motor based on the calculated first upper power limit value, the calculated second upper power limit value, requested power to be output to the motor for outputting motive power for traveling requested from another control device of a vehicle, and the first actual output power indicated in the first actual output power information; and when output instruction content for iteratively issuing an instruction for the power conversion process in the power convertor is determined, calculating second requested power obtained by correcting currently requested power based on a difference between first requested power that is previously requested power and the first actual output power output in accordance with the first requested power and determining the output instruction content to cause the first battery to output the second requested power, wherein the first battery is a high-capacity and low-power battery and the second battery is a battery having lower capacity and higher power than the first battery, and wherein the controlling of the power conversion process comprises determining the output instruction content to further cause the second battery to output electric power to be added to the electric power output by the first battery at a timing when the second requested power reaches a first threshold value less than the first upper power limit value.

\* \* \* \* \*